US005514632A

United States Patent [19]
Chester et al.

[11] Patent Number: 5,514,632
[45] Date of Patent: May 7, 1996

[54] USE OF AN ALUMINA CONTAINING BED FOR SILICON SPECIES CAPTURE IN THE MANUFACTURE OF SILICONE TREATED CATALYSTS

[75] Inventors: Arthur W. Chester, Cherry Hill; Jocelyn A. Kowalski, Clarksboro, both of N.J.

[73] Assignee: Mobil Oil Corporation, Fairfax, Va.

[21] Appl. No.: 370,272

[22] Filed: Jan. 9, 1995

[51] Int. Cl.$^6$ .................................................. B01J 29/06
[52] U.S. Cl. ............................... 502/63; 502/64; 502/71; 423/245.1; 427/255.1
[58] Field of Search ................................. 502/63, 64, 71; 106/33; 423/210, 245.1, 336; 427/255.1; 95/141

[56] References Cited

U.S. PATENT DOCUMENTS

| | | | |
|---|---|---|---|
| 3,702,886 | 11/1972 | Argauer et al. | 423/328 |
| 3,965,210 | 6/1976 | Chu | 260/671 M |
| 4,090,981 | 5/1978 | Rodewald | 252/455 Z |
| 4,100,219 | 7/1978 | Rodewald | 260/682 |
| 4,127,616 | 11/1978 | Rodewald | 260/671 R |
| 4,145,315 | 3/1979 | Rodewald | 252/455 Z |
| 4,176,047 | 11/1979 | Orrell et al. | 208/51 |
| 4,465,886 | 8/1984 | Rodewald | 585/467 |
| 4,477,583 | 10/1984 | Rodewald | 502/71 |
| 4,560,589 | 12/1985 | Endou et al. | 427/249 |
| 4,851,604 | 7/1989 | Absil et al. | 585/475 |
| 5,173,461 | 12/1992 | Absil et al. | 502/62 |
| 5,243,117 | 9/1993 | Chang et al. | 585/467 |
| 5,321,183 | 6/1994 | Chang et al. | 585/475 |
| 5,349,113 | 9/1994 | Chang et al. | 585/475 |
| 5,349,114 | 9/1994 | Lago et al. | 585/475 |

FOREIGN PATENT DOCUMENTS

WO93/17788  9/1993  WIPO .

OTHER PUBLICATIONS

"*Silicone Ink Additives: Compatability With Catalytic Incineration*", Handbook of Coatings Additives, Calbo, Leonard J. Copyright 1987 by Marcel Dekker, Inc., pp. 295–301 (no month).

"*Deactivation of HDT Catalysts by Formation of Silica Gels From Silicone Oil. et al.*", by Lars Kellbert et al., Journal of Catalysis, pp. 46–51. (1993) (no month).

"*Compatibility of Silicone Additives With Catalytic Incineration*", by Diane McKeon et al., Johnson Matthey Environmental Products Catalystic Systems Division (no date).

Primary Examiner—Gary P. Straub
Assistant Examiner—Thomas G. Dunn, Jr.
Attorney, Agent, or Firm—Ronald A. Bleeker; Dennis P. Santini; Lori F. Cuomo

[57] ABSTRACT

Silicon-containing species which evolve from the calcination of silicone treated catalysts may be removed by the use of an alumina-containing guard bed. The method is particularly useful for the production of silicone treated ZSM-5 catalysts.

14 Claims, No Drawings

USE OF AN ALUMINA CONTAINING BED FOR SILICON SPECIES CAPTURE IN THE MANUFACTURE OF SILICONE TREATED CATALYSTS

FIELD OF THE INVENTION

The method of the present invention relates to the use of alumina for silicon species capture in the manufacture of silicone treated catalysts.

BACKGROUND OF THE INVENTION

The poisoning effect of silicones on metal catalysts is known in the art. Polydimethylsilicone vapors are known to poison hydrotreating catalysts as described by Kellburg et al., "Deactivation of HDT Catalysts by Formation of Silica Gels from Silicone Oil characterization of Spent Catalysts from HDT of Coker Naphtha Using Si and C CP/MAS NMR," J. Catalysis 143, 45–51 (1993). The poisoning of volatile inorganic compound (VOC) catalysts, such as Pt/Alumina, by silicones in the ink/varnish industry has led to efforts to choose non-volatile silicones.

Silica modified catalysts for use in processes for the selective disproportionation of toluene to p-xylene are described in, for example, U.S. Pat. Nos. 4,477,583; 4,465,886; 4,145,315; 4,100,219; 4,851,604; 5,173,461; 5,243,117; and WO 93/17788.

In the manufacture of silica modified catalysts, volatile silicon-containing species in the effluent stream may plate out on downstream VOC catalysts and poison them. Therefore, it is an object of the present invention to avoid poisoning of downstream catalysts. It is a further object of the present invention to avoid damaging downstream equipment.

SUMMARY OF THE INVENTION

The method of the present invention uses an alumina-containing guard bed in the manufacture of a silicone polymer treated catalysts.

Catalytic molecular sieves treated with silicone compounds are calcined to convert the silicones to silica. This calcination of the silicone polymer treated catalytic molecular sieves results in the evolution of volatile silicon-containing species in the calciner effluent stream. The volatile silicon-containing species are not desirable because of their deleterious effects on downstream catalysts and hardware. In the method of the present invention, an alumina guard bed is put into the calciner effluent stream and silicon-containing decomposition products are captured by the alumina guard bed.

The method of the present invention is believed to make the calciner effluent stream acceptable for treatment in an effluent treatment unit, such as in a Selective Catalytic Reduction (SCR) and/or a VOC treater, since silicones are known poisons to the metals used in such catalysts. This may also make the calciner effluent stream suitable for recycle, thereby decreasing the usage of fresh nitrogen.

The invention therefore includes a method for the manufacture of a silicone treated catalytic molecular sieve comprising the steps of:

(a) contacting a catalytic molecular sieve with a silicone compound and drying to form a silicone treated catalytic molecular sieve;

(b) calcining the silicone treated catalytic molecular sieve and discharging an effluent stream comprising volatile silicon-containing species; and (c) passing the effluent stream from step (b) through a guard bed comprising alumina to remove volatile silicon-containing species in the effluent stream.

DETAILED DESCRIPTION OF THE INVENTION

The method of the present invention relates to the use of an alumina-containing guard bed for silicon species capture in the manufacture of silicone treated catalysts. The volatile silicon-containing species generated during the thermal decomposition of the silicone compound present a significant emmissions abatement problem.

Catalysts subject to silicone treatment include catalytic molecular sieves having a Constraint Index from about 1 to about 12 and include intermediate pore zeolites. Zeolites which conform to the specified values of Constraint Index for intermediate pore zeolites include ZSM-5, ZSM-11, ZSM-5/ZSM-11 intermediate, ZSM-12, ZSM-21, ZSM-22, ZSM-23, ZSM-35, ZSM-48, ZSM-50, ZSM-57 and Zeolite Beta which are described, for example, in U.S. Pat. Nos. 3,702,886 and Re. No. 29,949, 3,709,979, 3,832,449, 4,046,859, 4,556,447, 4,076,842, 4,016,245, 4,229,424, 4,397,827, 4,046,859, 3,308,069 and Re. 28,341 and EP 127,399 to which reference is made for details of these zeolites. MCM-22, described in U.S. Pat. No. 4,973,784, may also be subjected to silicone treatment. The method of the present invention is particularly useful in the manufacture of silicone treated ZSM-5. ZSM-5 is described in U.S. Pat. 3,702,886.

Silicone compounds which can be used in the present invention can be characterized by the general formula:

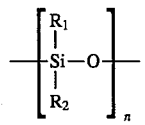

where $R_1$ is hydrogen, fluorine, hydroxy, alkyl, aralkyl, alkaryl or fluoro-alkyl. The hydrocarbon substituents generally contain from 1 to 10 carbon atoms and preferably are methyl or ethyl groups. $R_2$ is selected from the same group as $R_1$, and n is an integer of at least 2 and generally in the range of 3 to 1000. The molecular weight of the silicone compound employed is generally between about 80 and about 20,000 and preferably within the approximate range of 150 to 10,000. Representative silicone compounds include dimethylsilicone, diethylsilicone, phenylmethylsilicone, methylhydrogensilicone, ethylhydrogensilicone, phenylhydrogensilicone, methylethylsilicone, phenylethylsilicone, diphenylsilicone, methyltrifluoropropylsilicone, ethyltrifluoropropysilicone, polydimethylsilicone, tetrachlorophenylmethyl silicone, tetrachlorophenylethyl silicone, tetrachlorophenylhydrogen silicone, tetrachlorophenylphenyl silicone, methylvinylsilicone and ethylvinylsilicone. The silicone compound need not be linear but may be cyclic as for example hexamethylcyclotrisiloxane, octamethylcyclotetrasiloxane, hexaphenylcyclotrisiloxane and octaphenylcyclotetrasiloxane. Mixtures of these compounds may also be used as well as silicones with other functional groups.

The silicone compound is deposited on the external surface of the catalytic molecular sieve by any suitable method. For example, the silicone compound may be dissolved in a solvent, mixed with the catalyst, and then dried. The silicone compound employed may be in the form of a solution, a liquid or gas under the conditions of contact with a zeolite. Examples of methods of depositing silicon on the surface of the zeolite are found in U.S. Pat. Nos. 4,090,981, 4,127,616, 4,465,886 and 4,477,583 to Rodewald, which are incorporated by reference herein.

Following deposition of the silicone compound, the catalytic molecular sieve is calcined in air or an inert atmosphere. For example, the catalyst may be calcined in an inert atmosphere, preferably nitrogen, at a rate of 0.2° to 5° C./minute to a temperature greater than about 300° C. but below a temperature at which the crystallinity of the zeolite is adversely affected. Generally, such temperature will be below 600° C. Preferably the temperature of calcination is within the approximate range of 350° to 550° C. The product is then maintained at the calcination temperature in an oxygen-containing atmosphere, preferably air, usually for 1 to 24 hours, to yield a silica coated zeolite.

The calcination of the silicone polymer treated catalyst results in the evolution of volatile silicon-containing species in the effluent stream, such as segments of the original polymer, tricyclicsiloxanes, tetracyclicsiloxanes, $Si(CH_3)_4$, $(C_6H_5)(CH_3)_2Si$—O—$Si(CH_3)_3$, $(C_6H_5)_2Si(CH_3)_2$, and $(C_6H_5)(CH_3)_2Si$—O—$Si(CH_3)_2(C_6H_5)$. Since these species have the potential to plate out on downstream equipment, the further processing of or reuse of this stream is potentially damaging or prohibited.

It has now been found that passing the effluent through an alumina-containing guard bed captures a significant portion of the volatile silicon-containing species. In the alumina-containing guard bed, volatile silicon-containing species in the calciner effluent are converted to silica. The method removes greater than about 20 wt. %, preferably greater than 40 wt. % and more preferably greater than about 60 wt. % of the volatile silicon-containing species in the form of silica from the calciner effluent.

The calciner effluent stream may comprise other components, including organic fragments, such as benzene, toluene and methane.

The guard bed may be operated at substantially the same time and temperature as the calciner. The guard bed is operated at a temperature in the range of from about 100° C. to about 600° C. and at a pressure in the range of from about 0 psig to about 100 psig.

The total gas flow rate through the calciner and alumina guard bed is in the range of from about 0.1 to about 60 feet/minute linear velocity.

Suitable sources of alumina for use in the method of the present invention include high surface area alumina having a surface area greater than about 50 $m^2/g$ and preferably greater than about 100 $m^2/g$ such as activated alumina, gamma alumina, theta alumina and silica-alumina.

Removal of volatile silicon-containing species from the calciner effluent is expected to make the stream suitable for recycle, thereby decreasing the usage of fresh nitrogen. After passing through the guard bed the calciner effluent may be recycled to the calciner unit without further treatment.

The method of the present invention improves the quality of the effluent stream for potential reuse and protects the integrity of downstream equipment, such as piping, furnaces, and abaters. Possible reuses for the effluent stream include use as a heat exchange medium.

The catalytic molecular sieve bed and the alumina-containing guard bed may be in the same reactor. The reactors may also be used in series with the catalytic molecular sieve bed in the first reactor and the alumina-containing guard bed in the second reactor.

The method of the present invention may be used in conjunction with other means for removing silicon-containing species from the calciner effluent stream, such as condensation.

The following examples illustrate the process of the present invention. Upon discharge, the alumina guard bed is measured for its silica content. These results are set forth below in Table 1.

EXAMPLE 1

A 200 gram bed of a 65 wt. % ZSM-5 extrudate catalyst bound in silica is placed into a muffle pot for calcination with a 200 gram bed of a gamma alumina. The gamma alumina bed is at the effluent side of the catalyst bed. The materials are calcined at a total gas flow rate of 2.0 feet/minute linear velocity. The materials are heated to 538° C. (1000° F.) and cooled to 482° C. (900° F.) in nitrogen. A 100% air atmosphere is introduced and the temperature is raised to 538° C. (1000° F.) and held for 6 hours.

EXAMPLE 2

A silicone treated catalyst is prepared by contacting 100 parts of a 65 wt. % ZSM-5 extrudate catalyst bound in silica with 7.8 parts of a phenylmethyl-polysiloxane and 30.7 parts of a decane solvent and drying at 121° C. (250° F.) under vacuum. A 200 gram bed of this silicone treated catalyst is placed into a muffle pot for calcination with a 200 gram bed of a gamma alumina. The silicone treated catalyst contains the equivalent of 9.2 grams of silica resulting from the silicone treatment. The gamma alumina bed is at the effluent side of the silicone treated catalyst bed. The materials are calcined at a total gas flow rate of 0.8 feet/minute linear velocity. The materials are heated to 538° C. (1000° F.) and cooled to 482° C. (900° F.) in nitrogen. A 100% air atmosphere is introduced and the temperature is raised to 538° C. (1000° F.) and held for 6 hours.

EXAMPLE 3

Example 2 is repeated at a total gas flow rate of 2 feet/minute linear velocity. A 200 gram bed of the silicone treated catalyst, as prepared in Example 2, is placed into a muffle pot for calcination with a 200 gram bed of a gamma alumina. The gamma alumina bed is at the effluent side of the silicone treated catalyst bed. The materials are calcined at a total gas flow rate of 2.0 feet/minute linear velocity. The materials are heated to 538° C. (1000° F.) and cooled to 482° C. (900° F.) in nitrogen. A 100% air atmosphere is introduced and the temperature is raised to 538° C. (1000° F.) and held for 6 hours.

EXAMPLE 4

A silicone treated catalyst is prepared by contacting 100 parts of a 65 wt. % ZSM-5 extrudate catalyst bound in silica with 7.8 parts of a phenylmethyl-polysiloxane and 30.7 parts of a decane solvent and drying at 121° C. (250° F.) under vacuum. The steps of contacting with phenylmethyl-polysiloxane and decane solvent, drying and calcining are repeated for a total of 3 times. The catalyst is then contacted with phenylmethyl-polysiloxane and decane solvent for a total of 4 silicone treatments. A 200 gram bed of this silicone treated catalyst is placed into a muffle pot for calcination with a 200 gram bed of gamma alumina. The silicone treated catalyst contains the equivalent of 9.2 grams of silica resulting from the silicone treatment. The gamma alumina bed is at the effluent side of the silicone treated catalyst bed. The materials are calcined at a total gas flow rate of 0.8 feet/minute linear velocity. The materials are heated to 538° C. (1000° F.) and cooled to 482° C. (900° F.) in nitrogen. A 100% air atmosphere is introduced and the temperature is raised to 538° C. (1000° F.) and held for 6 hours.

EXAMPLE 5

Example 4 is repeated at a total gas flow rate of 2.0 feet/minute linear velocity. A 200 gram bed of the catalyst subjected to 4 silicone treatments, as prepared in Example 4, is placed into a muffle pot for calcination with a 200 gram bed of a gamma alumina. The alumina bed is at the effluent side of the silicone treated catalyst bed. The materials are calcined at a total gas flow rate of 2.0 feet/minute linear velocity. The materials are heated to 538° C. (1000° F.) and cooled to 482° C. (900° F.) in nitrogen. A 100% air atmosphere is introduced and the temperature is raised to 538° C. (1000° F.) and held for 6 hours.

The results of Examples 1 to 5 are summarized in Table 1 below. The quantity of volatile silicon-containing species present in the calciner effluent are reported in terms of the silica content (wt. %) in the effluent. In comparative Example 1, the catalyst is not treated with silicone. No silica is picked up by the alumina guard bed. In Examples 2 through 5, a significant level of silicon-containing species in the effluent are picked up by the alumina guard bed under different conditions, such as the number of silicone treatments and total gas flow rate.

TABLE 1

| EXAMPLE | 1 | 2 | 3 | 4 | 5 |
|---|---|---|---|---|---|
| Number of Silicone Treatments | 0 | 1 | 1 | 4 | 4 |
| Calcination Flow Rate, feet/min linear velocity | 2.0 | 0.8 | 2.0 | 0.8 | 2.0 |
| Wt. % Silica in Effluent Detected in Guard Bed Upon Discharge from Muffle Pot | 0 | 27 | 26 | 64 | 46 |

Changes and modifications in the specifically described embodiments can be carried out without departing from the scope of the invention which is intended to be limited only by the scope of the appended claims.

We claim:

1. A method for the manufacture of a silica coated catalyst comprising the steps of:

(a) contacting a catalytic molecular sieve with a silicone compound and drying to form a silicone treated catalyst;

(b) calcining the silicone treated catalyst in an inert atmosphere, followed by calcining in an oxygen-containing atmosphere, and discharging an effluent stream comprising volatile silicon-containing species;

(c) passing all effluent from step (b) through a bed comprising alumina to remove and convert the volatile silicon-containing species to silica;

(d) recovering a significantly reduced silicon containing gas stream from step (c).

2. The method of claim 1, wherein step (b) and step (c) are operated at a temperature in the range of from about 100° C. to about 600° C.

3. The method of claim 1, wherein said catalytic molecular sieve comprises ZSM-5.

4. The method of claim 1, wherein said alumina comprises gamma alumina.

5. The method of claim 1, wherein said alumina comprises activated alumina.

6. The method of claim 1, wherein the volatile silicon containing species are selected from the group consisting of tricyclicsiloxanes, tetracyclicsiloxanes, $Si(CH_3)_4$, $(C_6H_5)(CH_3)_2Si-O-Si(CH_3)_3$, $(C_6H_5)_2Si(CH_3)_2$, $(C_6H_5)(CH_3)_2Si-O-Si(CH_3)_2(C_6H_5)$, and mixtures thereof.

7. The method of claim 1, wherein the inert atmosphere is nitrogen.

8. The method of claim 7, wherein nitrogen present in effluent from step (c) is recycled to step (b).

9. The method of claim 1, wherein step (b) and step (c) are operated at a total gas flow rate in the range of from about 0.1 to about 60 feet/minute linear velocity.

10. The method of claim 1, wherein step (b) and step (c) are in the same reactor.

11. The method of claim 1, wherein step (b) and step (c) are in different reactors.

12. The method of claim 1, wherein greater than about 20 wt. % volatile silicon-containing species in the effluent stream from step (b) is removed in step (c).

13. The method of claim 1, wherein greater than about 40 wt. % volatile silicon-containing species in the effluent stream from step (b) is removed in step (c).

14. The method of claim 1, wherein greater than about 60 wt. % volatile silicon-containing species in the effluent stream from step (b) is removed in step (c).

* * * * *